Oct. 4, 1955    W. A. RAY    2,719,939
ELECTROMAGNETIC VALVE
Original Filed May 22, 1946

WILLIAM A. RAY,
INVENTOR.

BY John Flam
ATTORNEY

United States Patent Office 2,719,939
Patented Oct. 4, 1955

2,719,939

ELECTROMAGNETIC VALVE

William Alton Ray, North Hollywood, Calif., assignor to General Controls Co., Glendale, Calif., a corporation of California Original application May 22, 1946, Serial No. 671,583. Divided and this application February 10, 1951, Serial No. 210,409

5 Claims. (Cl. 317—165)

This invention relates to electromagnetically operated mechanisms, and particularly to those capable of responding to small electric currents. Such mechanisms are especially useful for operating valves in gas burner control systems in which the controlling current is obtained by thermoelectricity or photoelectricity.

This application is a division of application Serial Number 671,583, filed in the name of William A. Ray on May 22, 1946, and entitled "Electromagnetic Valve," now Patent No. 2,589,574.

It is an object of the present invention to provide an electromagnetic valve structure that is capable of controlling substantial flow of fluid where only minute current is available. For this purpose, use is made generally of an electromagnet having an enlarged polar area. In order to minimize the effective reluctance of the magnetic circuit so that the small currents operating the electromagnet may have maximum effect in operating a valve of substantial size, use is made of a particular valve structure that permits substantial flow upon only a small movement of the armature closure. By the use of such a valve, the armature may be spaced close to the pole face of the electromagnet when the electromagnet is deenergized. Accordingly, the air gap is of small size, and a large force is available to act on the armature to open the valve.

It is another object of this invention to provide an electromagnet structure which includes a magnetic circuit of small reluctance. For this purpose, use is made of a novel construction wherein there is but one joint in the magnetic circuit, said joint being so arranged that it has but little effect upon the reluctance of the magnetic circuit.

It is another object of this invention to provide a valve closure structure that cooperates in a novel manner with one pole of the electromagnet structure, whereby the closure remains in close contact with the pole face throughout the operating cycle.

It is still another object of this invention to provide an electromagnetic valve structure utilizing novel sealing means to isolate the magnet windings from the fluid thereby controlled, and which yet permits easy assembly of the apparatus.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Figure 1:
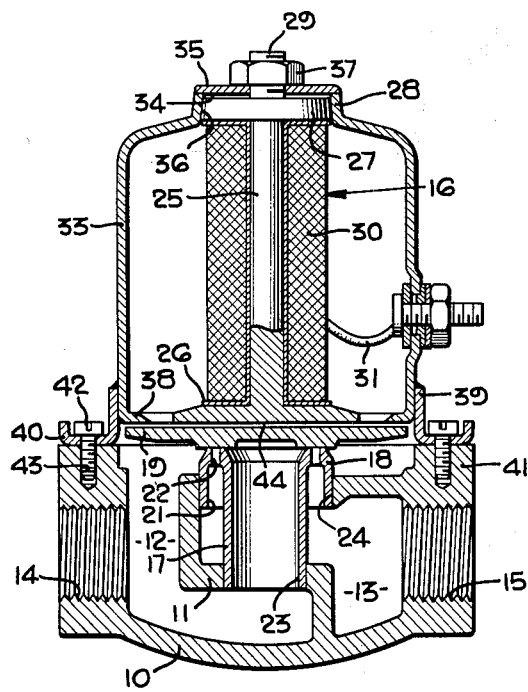
Figure 1 is an axial section through a valve incorporating the invention.
Figure 2:
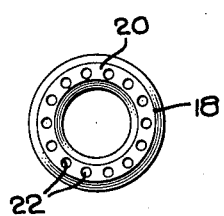
Fig. 2 is a plan view of the valve seat shown in Fig. 1.

In Figs. 1 and 2, there is illustrated a valve body 10 having a partition 11 dividing the interior of the valve into an inlet chamber 12 and an outlet chamber 13. The valve body 10 has appropriate threaded bores 14 and 15 communicating, respectively, with the inlet chamber 12 and the outlet chamber 13 for cooperation with inlet and outlet conduits (not shown).

The valve body 10 is open at the top side, as shown in the drawings, for cooperation with an electromagnet assembly 16 to be hereinafter more fully described.

Figure 3:
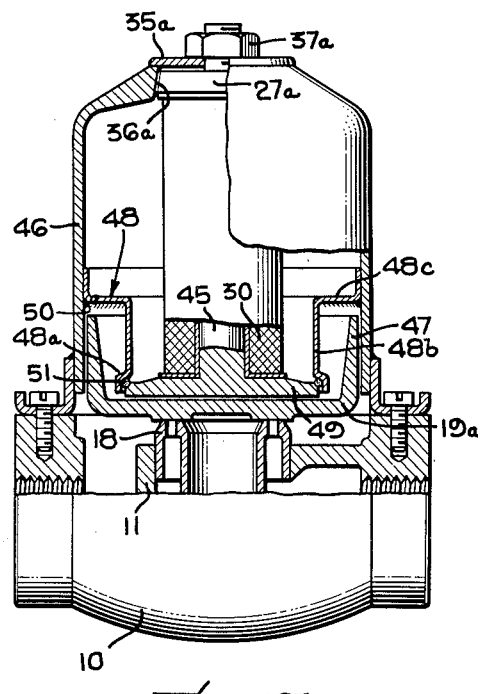
Fig. 3 is a view similar to Fig. 1, illustrating a modified form of this invention.

A partition 11 extends across the valve body 10, encompassing the outlet bore 15. A seat member 17, generally of open tubular form, is accommodated in the partition 11 to provide an annular valve seat 18 through which fluid discharges. A disc-type closure member 19, as shown in Fig. 1, or a closure 19a, as shown in Fig. 3, cooperates with the valve seat 18 for permitting or preventing passage of fluid through the valve, in accordance with the energization of the electromagnet 16.

The valve seat is formed in the tubular seat member 17 by a flat annular portion 20 at the upper end of the member 17 that connects the main body portion of the member 17 and a down-turned flange 21. The annular portion 20 has a plurality of annularly arranged apertures forming discharge ports 22.

The partition 11 is of a particular configuration, so that the inlet chamber 12 extends for a considerable distance beneath it.

The wall 11, separating the inlet chamber 12 from the outlet chamber 13, has a horizontal portion extending over the chamber 13. The tubular seat-forming member 17 is firmly attached to the wall 11 as by the flange 21 engaging the aperture 24, and by the lower end engaging in an aperture 23 in the lower horizontal portion of wall 11. Obviously, unless ports 22 are open, the inlet chamber 12 is out of communication with outlet chamber 13. However, the interior of member 17 is in communication with the inlet.

The interior of the tubular member 17 extends the inlet chamber 12 in order that the annularly arranged outlet ports 22 be surrounded by the inlet chamber on all sides, so that, even upon a slight lifting of the closure 19 or 19a from the seat 20, substantial volumes of fluid may readily pass through the ports 22. Accordingly, to control a given volume of fluid, only a small lifting of the closure 19 or 19a is necessary.

This valve structure is shown and described in my divisional application, Serial Number 405,972, filed December 11, 1953, and entitled Electromagnetic Valve.

Referring particularly to Fig. 1, the electromagnet assembly 16 comprises a cylindrical core 25 of relatively small diameter, with an enlarged pole piece 26 at its lower end providing a large polar area for attracting the closure 19. The upper end of the core 25 is provided with a large circular head 27 having a tapered exterior surface 28 and a threaded extension 29. The pole piece 26 and the head 27 may both be integral with the core 25. An energizing coil 30 is wound on the core 25, and is adapted to be connected through appropriate leads such as 31 with a source of electric energy, such as a thermoelectric generator or an electron multiplier tube (not shown).

An inverted cup or shell 33, which may be formed of sheet metal having good magnetic qualities, is secured on core 25 in a manner to provide a joint of low reluctance. For this purpose, the top of the shell 33 is provided with a reduced tapered opening 34, closed by a cap 35 secured, as by welding, to the shell 33, and forming a recess 36 for accommodating the head 27.

A nut 37, threaded on the extension 29, serves, by engagement with the cap 35, to urge head 27 tightly into engagement with the wall of the recess 36.

The lower end portion of the shell 33 has an inturned edge or annular flange 38 forming a substantial polar surface extending about the pole piece 26, and cooperating therewith to attract the closure 19, which is of magnetic material. The flange 38 may provide a polar area substantially equal to that provided by pole piece 26. The parts are so proportioned that, when the core 25 is tightly secured to the shell 33, the lower surface of the flange 38 lies in the plane of the polar area of pole piece 26.

The shell 33 has an exterior extension 39 at its lower end secured to the shell 33, as by welding, and providing an outwardly directed annular flange 40 by which the shell 33 is secured in fluid-tight relation to the valve body 10, circumscribing the top opening of the body 10. The flange 40 cooperates with an annular flange 41 of the body 10, and is secured thereto by a plurality of bolts 42 accommodated in appropriate threaded bores 43 of the body 10. The shell 33 accordingly forms a part of the inlet chamber 12.

The shell-supporting flange 40 and flange 41 of the body are so located that the vertical distance between the pole elements 26 and 38 from the valve seat 18 is just slightly greater than the effective width of the disc closure 19. Accordingly, when the electromagnet 16 is deenergized, permitting closure 19 to rest upon seat 18 to close ports 22, the top surface 44 of the closure is but a small distance from the poles formed by members 26 and 38, such, for example, as from 1/16" to 3/32". Accordingly, the reluctance of the magnetic circuit is minimized so that, upon the existence of current through windings 30, a substantial amount of force is exerted upon the closure 19 to lift it from the seat 18. The particular arrangement of the tubular member 17 provides for a large flow of fluid for the small movement of the closure.

The reluctance of the magnetic circuit apart from the armature closure 19 is minimized by having only one joint therein at the tapered opening 36. This joint is made over a substantial area, the head 27 being of substantial diameter and width. The wedging relation that exists between the head 27 and the shell 33 further ensures close contact between the head 27 and shell 33.

The shell 33, closure 19, and core 25 are made of material that does not remain magnetized after deenergization of the coil 30. Accordingly, on deenergization thereof, the closure 19 is released substantially immediately, and drops upon the seat 18.

Referring to the form of the invention illustrated in Fig. 3, the electromagnet structure is similar to that of Fig. 1. In the present instance, the valve body 10 is the same as that illustrated in Fig. 1. The electromagnet core 45 and shell 46 are substantially the same as core 25 and shell 33. In the present instance, however, the polar area at the lower end of the shell 46 is provided in a different manner. The closure 19a is formed with an upstanding peripheral cylindrical flange 47 which telescopes closely within the lower end of the shell, a clearance of .005", for example, being provided.

The reluctance added to the magnetic circuit due to the spacing between the flange 47 and the shell 46 depends, first, upon the distance across the air gap, which can be considered constant due to the telescoping relationship and, second, upon the effective area of the air gap. In the present form, the distance across the air gap between shell 46 and 47 is kept exceedingly small and invariant. Since the closure 19a moves only through a small distance, the percentage change in the effective area of the air gap is insignificant. Accordingly, the electromagnet structure in the present form largely eliminates added reluctance due to the spacing between the peripheral portion of the armature closure 19a and the shell 46. Improved operation is thereby achieved.

In the present form, the core 45 is secured to the shell in a manner similar to that illustrated in Fig. 1, an enlarged integral head 27a of core 45 being secured in a tapered recess 36a by a nut 37a and cap 35a. In the present instance, the shell 46 at the place of juncture with the head 27a is of a thickness increasing in a direction toward the cylindrical portion of shell 46. Thus the magnetic lines of force in the shell near the recess 36a extend in a uniform and substantially straight path to this cylindrical portion. There are no sharp changes in the flux path. A corresponding reduction in magnetic reluctance is thus obtained.

In some installations, it may be desirable to isolate the magnet windings 30 from the fluid controlled. The valve illustrated in Fig. 3 is arranged to accomplish this function in a simple manner. For this purpose, an annular wall or partition 48 of non-magnetic material is provided, extending between the inside surface of shell 46 and the pole piece 49.

To facilitate assembly of the core 45 and the shell 46, the partition 48 is permanently secured only to the shell, as by being welded thereto in a fluid-tight manner indicated at 50. The partition 48 is arranged to form a fluid-tight joint with the pole piece 49 upon assembly of the core 45 with the shell 46. For this purpose, the partition 48 has an annular flange 48a circumscribing the pole piece 49. This flange 48a urges a packing ring 51 of yielding material against the pole piece 49. An appropriate groove may be provided in the pole piece for retaining the packing ring 51.

The partition 48 is shown in Fig. 3 as arranged to provide a space for accommodating the flange 47 of the closure 19a, as by having a circular wall or skirt portion 48b, of about the same diameter as the pole piece 49, for engaging the packing 51. This skirt 48b extends upwardly a suitable distance beyond the flange 47 where it is joined to an outwardly extending portion 48c, joined to the shell 46 by the weld 50.

The inventor claims:

1. In an electromagnetic device: a movable magnetic member having a peripheral, substantially cylindrical flange; an electromagnet core having an enlarged pole piece forming on one side thereof an end surface of said core defining a polar area, said pole piece extending within said cylindrical flange for operation of said member; an electromagnet winding mounted on the core; an inverted cup of magnetic material mounted on said body and secured in intimate contact to the other end of the core for supporting the magnet within the cup; said cup providing a polar area telescopingly receiving the flange on said member; and a partition of non-magnetic material extending in sealing relation between the inside of the cup and the other side of said pole piece of the core, for isolating the magnet winding, said partition having a circular skirt portion forming with the cup, an annular space for accommodating said cylindrical flange.

2. In an electromagnetic device: an electromagnet having a central core with an enlarged pole piece at one end, a coil on said core, and a shell surrounding said core, said shell being secured to said core at that end of said core opposite said pole piece; a magnetic operating member engageable with said pole piece, said member having an upwardly extending annular flange telescopingly received by said shell, and encompassing said pole piece; the upward movement of said operating member being limited by engagement of said operating member with said pole piece; and means including an annular partition of non-magnetic material extending from the interior of said shell at a place above said annular flange to said pole piece of said core for isolating said coil.

3. In an electromagnetic device: an electromagnet having a central core with an enlarged pole piece at one end; a coil on said core; a cup-like shell surrounding said core; said shell having an opening at one end; means detachably securing said shell and said core at that end of said core remote from said pole piece and at the other end of said shell, said core being removable through said shell opening; a magnetic operating member cooperating with said pole piece, said member having an upwardly extending annular flange in telescoping relationship with said shell at said one end of said shell; an annular partition of non-magnetic material extending from the interior of said shell to the peripheral portion of said enlarged pole piece; and a sealing element between the pole piece and the partition, and urged into sealing relationship upon securing said core to said shell.

4. In an electromagnetic device: an electromagnet having a central core with an enlarged pole piece at one end and having an annular groove near the periphery of the reverse side thereof; a coil on said core; a cup-like shell surrounding said core; said shell having an opening at one end; means detachably securing said shell and said core at that end of said core remote from said pole piece and at the other end of said shell, said core being removable through said shell opening; a magnetic operating member cooperating with said pole piece, said member having an upwardly extending annular flange in telescoping relationship with said shell at said one end of said shell; an annular partition of non-magnetic material extending from the interior of said shell to the peripheral portion of said enlarged pole piece; and a resilient ring in said groove and in engagement with said partition, said ring being urged into sealing relationship upon securing said core to said shell.

5. In an electromagnetic device: an electromagnet having a core with an enlarged pole piece at one end, said core having a longitudinally tapered head at the other end; a shell of magnetic material enclosing said core, said shell having a tapered recess accommodating said tapered head; means urging said head longitudinally into said recess for intimate contact therebetween; and a magnetic operating member having a cylindrical peripheral flange in telescoping relationship with said shell and surrounding said pole piece, said member being supported for limited movement axially of said shell and said shell forming a polar area cooperating with said flange.

References Cited in the file of this patent

UNITED STATES PATENTS

| | | |
|---|---|---|
| 1,059,120 | Cotton | Apr. 15, 1913 |
| 1,664,043 | Niclausse | Mar. 27, 1928 |
| 2,142,066 | Eppelsheimer | Dec. 27, 1938 |
| 2,219,324 | Lee | Oct. 29, 1940 |
| 2,237,554 | Grove | Apr. 8, 1941 |
| 2,321,853 | Ray | June 15, 1943 |
| 2,325,878 | Ray | Aug. 3, 1943 |
| 2,358,828 | Ray | Sept. 26, 1944 |
| 2,372,853 | Ray | Apr. 3, 1945 |
| 2,382,664 | Ray | Aug. 14, 1945 |
| 2,399,295 | Ray | Apr. 30, 1946 |
| 2,422,260 | Ray | June 17, 1947 |
| 2,457,017 | Walley | Dec. 21, 1948 |
| 2,465,036 | Ray | Mar. 22, 1949 |